(12) United States Patent
Schwarz et al.

(10) Patent No.: US 11,339,723 B2
(45) Date of Patent: May 24, 2022

(54) GEARED TURBOFAN HIGH GEARBOX POWER DENSITY

(71) Applicant: RAYTHEON TECHNOLOGIES CORPORATION, Farmington, CT (US)

(72) Inventors: Frederick M. Schwarz, Glastonbury, CT (US); William G. Sheridan, Southington, CT (US); Glenn Levasseur, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 100 days.

(21) Appl. No.: 14/431,839

(22) PCT Filed: Mar. 15, 2013

(86) PCT No.: PCT/US2013/031938
§ 371 (c)(1),
(2) Date: Mar. 27, 2015

(87) PCT Pub. No.: WO2014/055122
PCT Pub. Date: Apr. 10, 2014

(65) Prior Publication Data
US 2015/0267618 A1  Sep. 24, 2015

Related U.S. Application Data

(60) Provisional application No. 61/708,120, filed on Oct. 1, 2012.

(51) Int. Cl.
*F16H 1/36* (2006.01)
*F02C 7/36* (2006.01)
(Continued)

(52) U.S. Cl.
CPC .............. *F02C 7/36* (2013.01); *B23P 15/14* (2013.01); *F02C 3/107* (2013.01); *F16H 1/36* (2013.01);
(Continued)

(58) Field of Classification Search
CPC .................. Y02T 50/671; F02C 7/36; F05D 2260/40311; B23P 15/14
See application file for complete search history.

(56) References Cited

U.S. PATENT DOCUMENTS 2,936,108 A * 5/1960 Swain, Jr. ............. F01D 17/162
415/137
2,936,655 A * 5/1960 Peterson ............... F16H 1/2809
475/347

(Continued)

FOREIGN PATENT DOCUMENTS

WO  2011/100499 A1  8/2011

OTHER PUBLICATIONS

European Search Report for EP Application No. 13843540.9 dated Sep. 23, 2015.
(Continued)

*Primary Examiner* — Sherry L Estremsky
(74) *Attorney, Agent, or Firm* — Carlson, Gaskey & Olds, P.C.

(57) ABSTRACT

A geared architecture for a gas turbine engine includes a central gear supported for rotation about the axis, a plurality of intermediate gears engaged with the central gear and a ring gear circumscribing the intermediate gears. A first flexible coupling is provided between an input shaft driven by a turbine section and the sun gear. The geared architecture provides a power density comprising a power measured in
(Continued)

horsepower (HP) related to a weight of the geared architecture within a defined range that benefits overall engine weight and efficiency.

16 Claims, 4 Drawing Sheets

(51) Int. Cl.
*F02C 3/107* (2006.01)
*B23P 15/14* (2006.01)
*F16H 1/48* (2006.01)
*F16H 57/04* (2010.01)

(52) U.S. Cl.
CPC .......... *F16H 1/48* (2013.01); *F16H 57/0412* (2013.01); *F16H 57/0486* (2013.01); *F05D 2260/40311* (2013.01); *Y02T 50/60* (2013.01); *Y10T 29/49316* (2015.01)

(56) References Cited

U.S. PATENT DOCUMENTS

| | | | | |
|---|---|---|---|---|
| 3,325,087 A * | 6/1967 | Davis | ............. | F04D 29/563 415/209.3 |
| 3,381,475 A * | 5/1968 | Aubrey | ............. | F02C 3/107 60/226.1 |
| 3,491,537 A * | 1/1970 | Stona | ............. | F02C 7/105 165/8 |
| 3,519,368 A * | 7/1970 | Howald | ............. | F01D 5/282 416/216 |
| 3,572,971 A * | 3/1971 | Seiwert | ............. | F01D 5/282 416/230 |
| 3,722,216 A * | 3/1973 | Bahr | ............. | F23R 3/14 60/804 |
| 4,083,094 A * | 4/1978 | Silvestri | ............. | F16H 1/48 219/121.14 |
| 4,118,997 A * | 10/1978 | Woodward | ............. | F02C 7/36 74/417 |
| 4,214,440 A | 7/1980 | Rucker | | |
| 5,253,472 A * | 10/1993 | Dev | ............. | F01D 5/085 60/39.43 |
| 5,299,914 A * | 4/1994 | Schilling | ............. | F01D 5/141 416/203 |
| 5,433,674 A * | 7/1995 | Sheridan | ............. | F01D 5/02 475/346 |
| 5,472,386 A | 12/1995 | Kish | | |
| 5,724,643 A * | 3/1998 | Ewing | ............. | B22F 7/08 419/8 |
| 5,802,921 A * | 9/1998 | Rouverol | ............. | F16H 55/0806 74/458 |
| 6,024,549 A * | 2/2000 | Lee | ............. | F01C 1/3441 418/135 |
| 6,048,174 A * | 4/2000 | Samit | ............. | F01D 5/147 416/223 A |
| 6,223,616 B1 | 5/2001 | Sheridan | | |
| 6,626,059 B1 | 9/2003 | Fischer et al. | | |
| 6,731,017 B2 * | 5/2004 | Mikhail | ............. | F16H 1/22 290/1 C |
| 6,964,155 B2 | 11/2005 | McCune et al. | | |
| 8,075,270 B2 * | 12/2011 | Violette | ............. | F01D 7/00 416/148 |
| 8,172,716 B2 | 5/2012 | McCune | | |
| 8,205,432 B2 | 6/2012 | Sheridan | | |
| 8,231,503 B2 * | 7/2012 | Buelna | ............. | B64D 35/00 475/344 |
| 2004/0128978 A1 | 7/2004 | McCune et al. | | |
| 2007/0012026 A1 | 1/2007 | Dev | | |
| 2009/0223052 A1 | 9/2009 | Chaudhry et al. | | |
| 2010/0105516 A1* | 4/2010 | Sheridan | ............. | F01D 25/18 475/346 |
| 2010/0317477 A1 | 12/2010 | Sheridan et al. | | |
| 2010/0326050 A1 | 12/2010 | Schilling et al. | | |
| 2010/0331140 A1 | 12/2010 | McCune | | |
| 2012/0121378 A1 | 5/2012 | Sheridan et al. | | |
| 2012/0237336 A1 | 9/2012 | McCune et al. | | |
| 2013/0259653 A1* | 10/2013 | Schwarz | ............. | F01D 15/12 415/122.1 |
| 2016/0326964 A1* | 11/2016 | Curlier | ............. | F02K 3/072 |

OTHER PUBLICATIONS

International Search Report and Written Opinion for International Application No. PCT/US201 3/031938 dated Jul. 25, 2013.
International Preliminary Report on Patentability for PCT Application No. PCT/US2013/031938, dated Apr. 16, 2015.

* cited by examiner

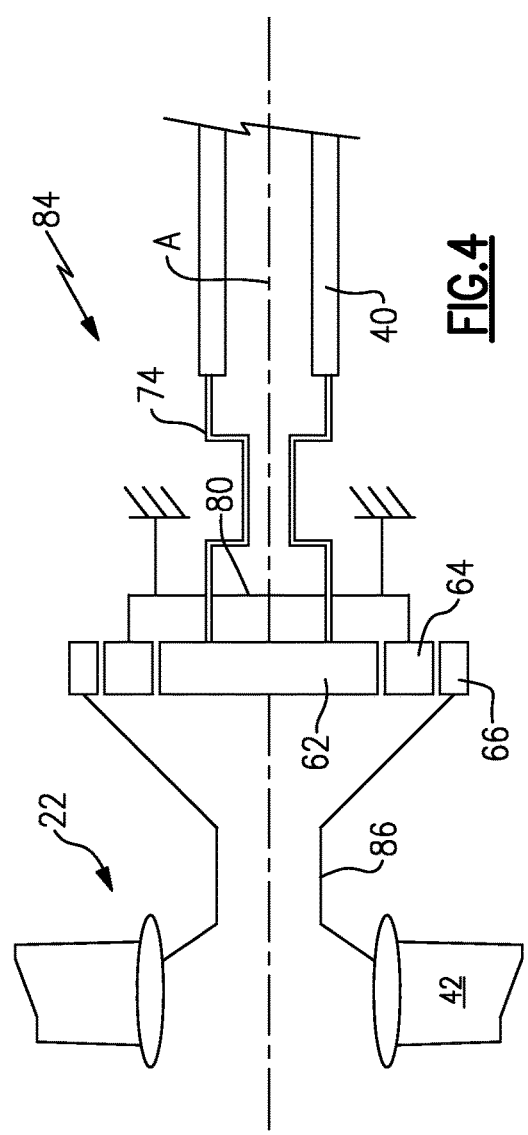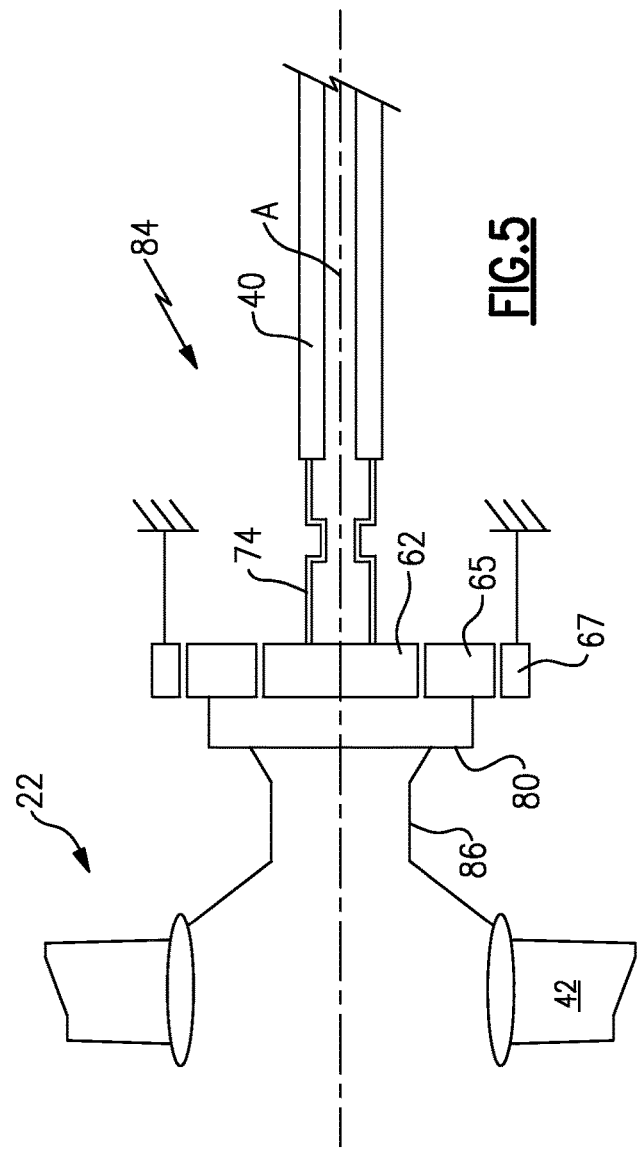

GEARED TURBOFAN HIGH GEARBOX POWER DENSITY

CROSS REFERENCE TO RELATED APPLICATION

This application claims priority to U.S. Provisional Application Ser. No. 61/708,120 filed on Oct. 1, 2012.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

A gas turbine engine according to an exemplary embodiment of this disclosure, among other possible things includes a fan, a turbine section, and a geared architecture driven by the turbine section for rotating the fan. The geared architecture includes a power density comprising a power measured in horsepower (HP) related to a weight of the geared architecture, with the power density being between about 20 HP/lb and about 125 HP/lb.

In a further embodiment of the foregoing gas turbine engine, the power density is between about 30 HP/lb and about 90 HP/lb.

In a further embodiment of any of the foregoing gas turbine engines, the power density is between about 50 HP/lb and about 75 HP/lb.

In a further embodiment of any of the foregoing gas turbine engines, the geared architecture includes an epicyclic gearbox including a central gear supported for rotation about the axis, a plurality of intermediate gears engaged with the central gear and a ring gear circumscribing the intermediate gears. The intermediate gears are supported on a journal bearing including a hollow bore.

In a further embodiment of any of the foregoing gas turbine engines, the journal bearing is supported on a flexible structure.

In a further embodiment of any of the foregoing gas turbine engines, includes a flexible link between a shaft driven by the turbine section and the central gear accommodating misalignment between the shaft and the central gear.

In a further embodiment of any of the foregoing gas turbine engines, the geared architecture includes a gearbox that provides a speed reduction between the turbine section and the fan that transfers power input from the turbine section to the fan at an efficiency greater than about 98%.

In a further embodiment of any of the foregoing gas turbine engines, includes a lubrication system providing lubricant to the gearbox and removing thermal energy from the gearbox. The lubrication system includes a capacity for removing thermal energy equal to less than about 2% of power input into the gearbox.

In a further embodiment of any of the foregoing gas turbine engines, the gearbox includes a sun gear driven by the turbine section, a non-rotatable carrier, a plurality of star gears supported on the carrier and driven by the sun gear, a ring gear circumscribing the plurality of star gears, a first flexible coupling between an input shaft driven by the turbine section and the sun gear, and a second flexible coupling between a fixed structure and the carrier.

In a further embodiment of any of the foregoing gas turbine engines, the gearbox includes a sun gear driven by the turbine section, a rotatable carrier, a plurality of planet gears supported on the carrier and driven by the sun gear, a ring gear circumscribing the plurality of planet gears, a first flexible coupling between an input shaft driven by the turbine section and the sun gear, and a second flexible coupling between a fixed structure and the ring gear.

A geared architecture for a gas turbine engine according to an exemplary embodiment of this disclosure, among other possible things includes an gearbox including a central gear supported for rotation about the axis, a plurality of intermediate gears engaged with the central gear and a ring gear circumscribing the intermediate gears. and a first flexible coupling between an input shaft driven by a turbine section and the sun gear. The gearbox includes a power density comprising a power measured in horsepower (HP) related to a weight of the geared architecture, with the power density being between about 20 HP/lb and about 125 HP/lb.

In a further embodiment of the foregoing geared architecture, the power density is between about 30 HP/lb and about 90 HP/lb.

In a further embodiment of any of the foregoing geared architectures, the power density is between about 50 HP/lb and about 75 HP/lb.

In a further embodiment of any of the foregoing geared architectures, includes a second flexible coupling supporting journal bearings for the plurality of intermediate gears.

A method of assembling a geared architecture for a gas turbine engine according to an exemplary embodiment of this disclosure, among other possible things includes assembling a gearbox to include a central gear supported for rotation about an axis, a plurality of intermediate gears engaged with the central gear and a ring gear circumscribing the intermediate gears, and defining each of the central gear, the plurality of intermediate gears and the ring gear to provide a power density comprising a power measured in horsepower (HP) related to a weight of the geared architecture, with the power density being between about 20 HP/lb and about 125 HP/lb.

In a further embodiment of the foregoing method, includes further defining each of the central gear, the plurality of intermediate gears and the ring gear to provide a power density comprising a power measured in horsepower (HP) related to a weight of the geared architecture, with the power density being between about 30 HP/lb and about 90 HP/lb.

In a further embodiment of any of the foregoing methods, includes further defining each of the central gear, the plurality of intermediate gears and the ring gear to provide a power density comprising a power measured in horsepower (HP) related to a weight of the geared architecture, with the power density being between about 50 HP/lb and about 75 HP/lb.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a schematic view of one example geared architecture configuration.

FIG. 5 is a schematic view of another example geared architecture configuration.

DETAILED DESCRIPTION

Figure 1:
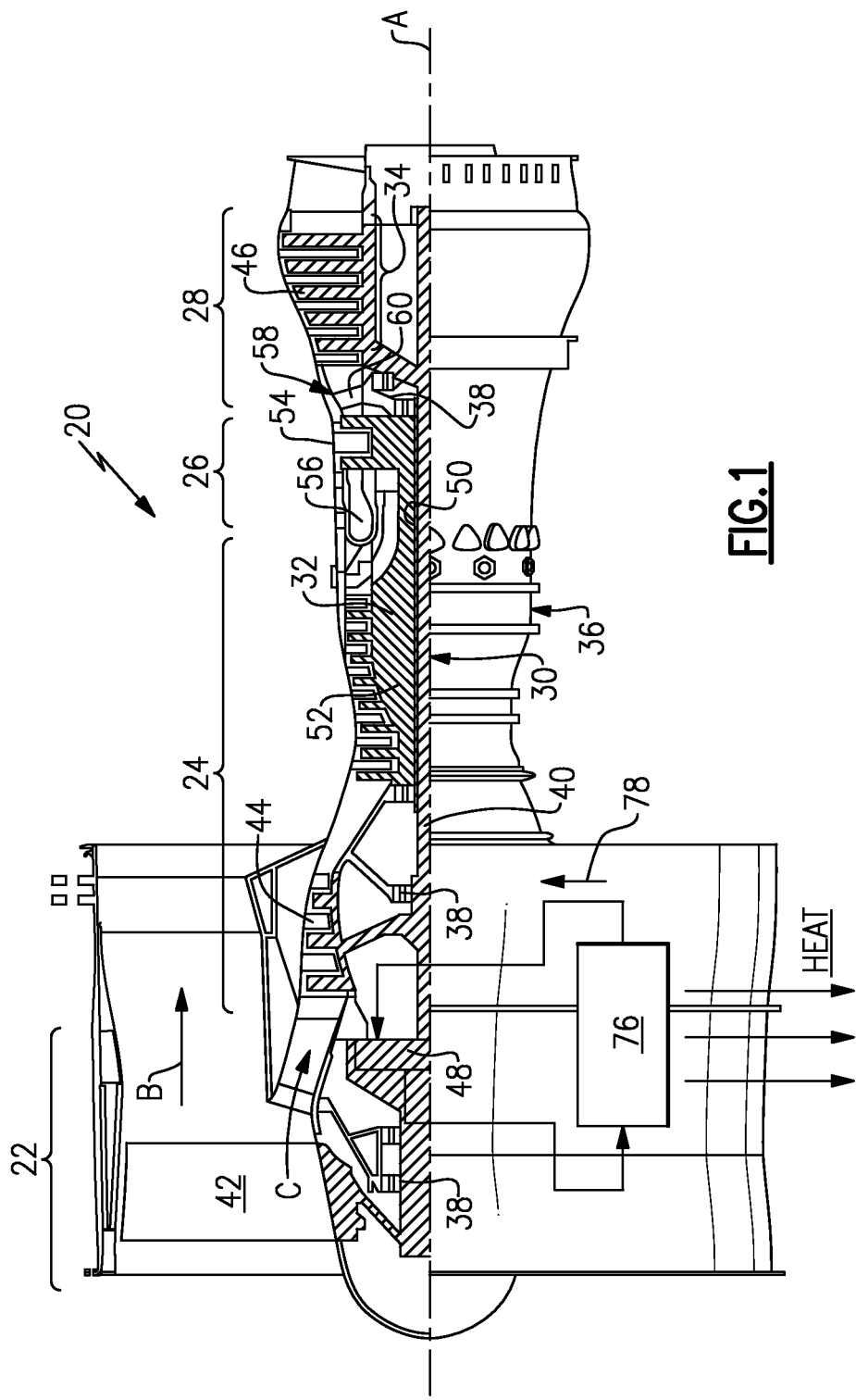
FIG. 1 is a schematic view of an example gas turbine engine.

FIG. 1 schematically illustrates an example geared turbofan engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A disclosed example geared turbofan engine 20 includes a reduced gearbox weight that enables improved overall engine weight, pylon weight, wing structure weight and overall aircraft fuel burn. A lubrication system 76 provides a flow of lubricant to the geared architecture 48. Lubricant flowing through the geared architecture 48 removes heat to maintain the geared architecture within a desired operational temperature range.

Figure 2:
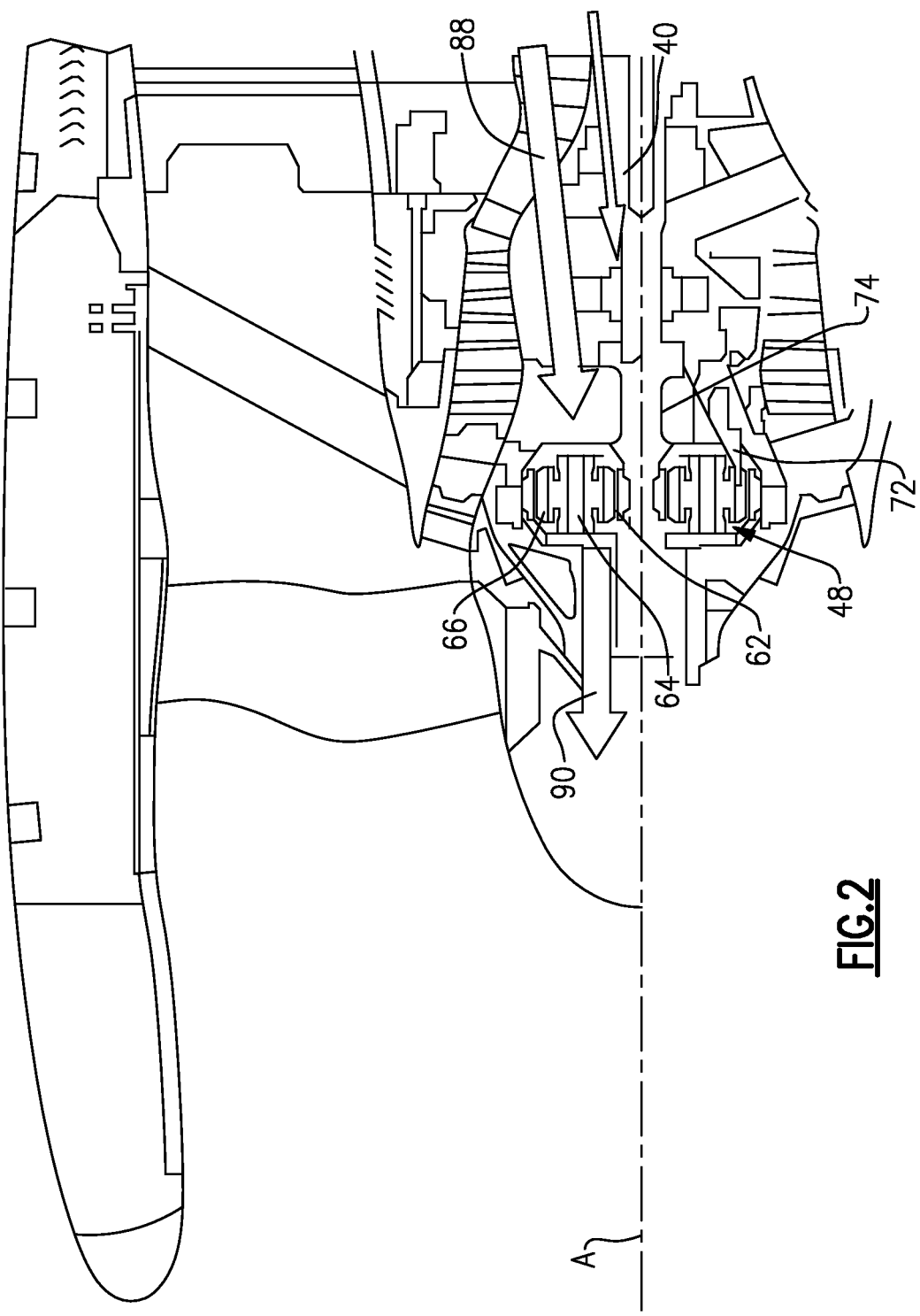
FIG. 2 is a schematic view of an example geared architecture mounted within a geared turbofan engine.
Figure 3:
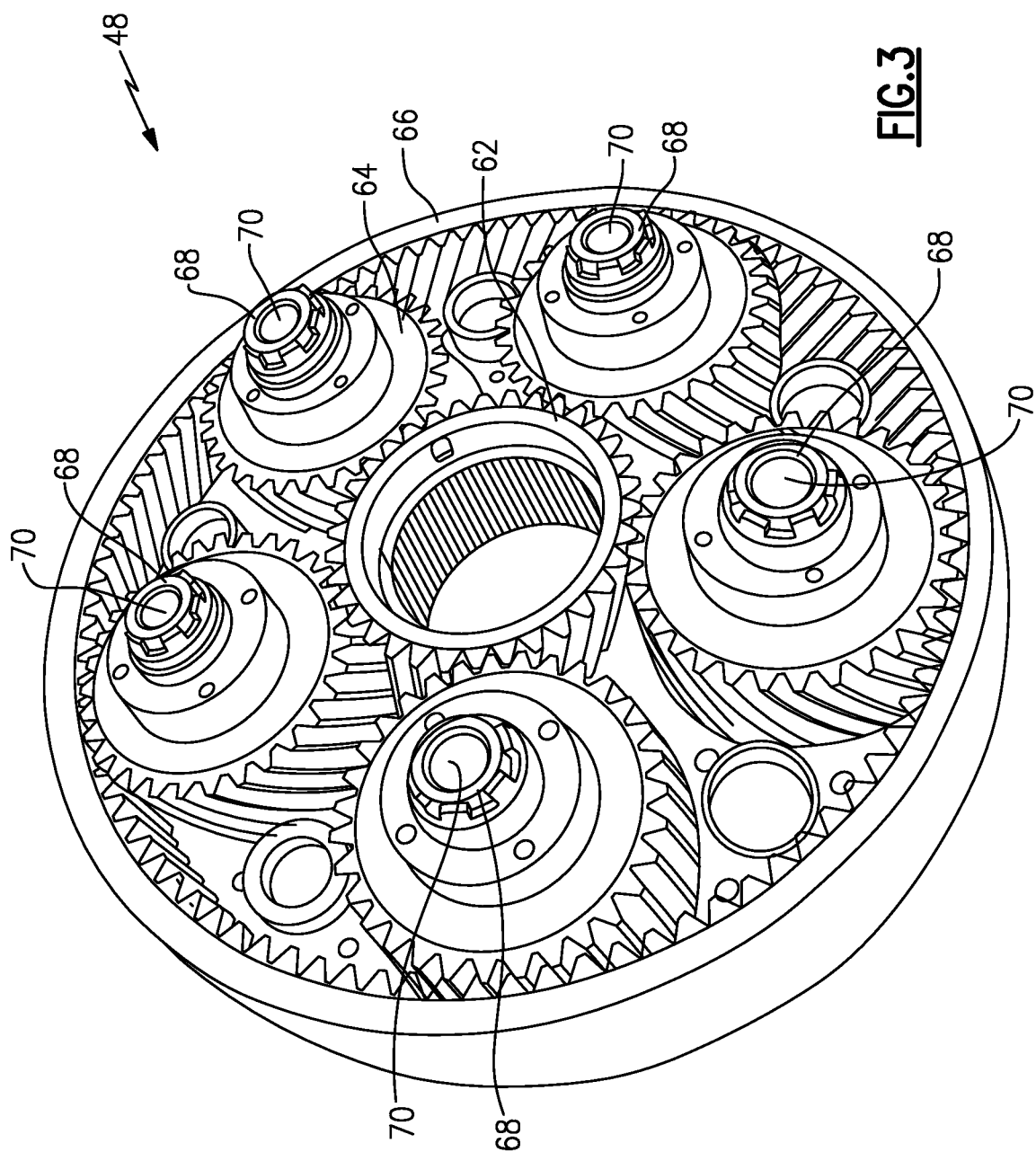
FIG. 3 is a perspective view of an example epicyclic gearbox.

Referring to FIGS. 2 and 3 with continued reference to FIG. 1, a disclosed example geared turbofan engine 20 includes the geared architecture 48 that is an epicyclic gearbox with a power density. Power density is a measure of the power that is transmitted through the geared architecture 48 for a volume of the geared architecture 48. Power in (schematically indicated by arrow 88) from the low pressure turbine 46 is transferred through the geared architecture 48 as a power out (schematically indicated by arrow 90) to drive the fan section 22. Efficiency in power transfer through the geared architecture 48 enables the realization of propulsive improvements provided by the more favorable rotational speeds of by the fan section and the low pressure turbine 46.

Power density values are enabled by several features utilized together and/or in selected combinations to reduce engine weight and cost. Features enabling desired power density values are selected based in view of other operating parameters such as engine thrust class. For example, a 17,000 pound thrust engine might require a solid feature or component instead of a lighter hollow component configuration, whereas in a 97,000 pound thrust engine it might be quite practical to make a feature hollow due to sizes and available design space.

One example geared architecture is an epicyclic gearbox 48 including a central or sun gear 62 supported for rotation about the axis A, a plurality of intermediate or star gears 64 engaged with the sun gear 62 and a ring gear 66 circumscribing the star gears 64. The star gears are supported on a journal bearing 68 including a hollow bore 70.

The journal bearing 68 is supported on a flexible structure 72 to provide for misalignment and to enable the gearbox 48 to be supported with a much lighter support structure. A flexible link 74 is provided between the shaft 40 driven by the low pressure turbine 46 to accommodate misalignment between the shaft 40 and the sun gear 62. The flexible link 74 enables lighter and less rigid structures of the gearbox 48 and of the mounting structures supporting the gearbox 48.

Moreover, the example gearbox 48 enables the transfer of power input from the low pressure turbine 46 to the fan section at efficiencies greater than about 98%. The high efficiency results in a much reduced amount of energy converted to thermal energy that is required to be accommodated and removed by the lubrication system 76.

In this example, the lubrication system 76 is sized such that it requires only a capacity for removing thermal energy from the gearbox 48 that is equal to or less than about 2% of the power input 88 into the gearbox 48. The reduced capacity requirement enables the use of a lighter lubricant system 76 that further increases overall engine efficiencies.

Additionally, features enabling the gearbox 48 to be lighter include the journal bearing 68 with hollow bores 70 that are expanded to further enable a final power density of the example gearbox 48. Moreover, other configuration selections enable lighter gearbox construction such as for example, hollow gear bore areas, higher gear ratios, and spring support features such as the flexible link 74 at the end of the LPT shaft 40.

Additional disclosed high power density gearbox enabling features include the flexible structures 72 inside the journal bearings, and more efficient measures to reduce oil inlet temperature at design operating conditions. Moreover, material selection of the gearbox enables increased lubricant and operating temperature ranges thereby reducing cooling requirements.

Further enabling features of the disclosed high power density gearbox include configurations that reduce those features that make the gearbox heavier and larger such as ball bearings, roller bearings, lower gear ratios and static rigid mounting structures instead of flexible features for supporting the gearbox.

High gearbox power density along with high efficiency enables reduced power plant system weight and fuel burn. Accordingly, the example high gearbox power density provides for the transfer of most of the energy from the turbine to the fan without losses through heat through the gearbox lubricant. Some heat might be recovered by a fuel-oil heat exchanger, however, losses in such transference of heat energy can degrade such benefits.

In one disclosed example, the gearbox 48 includes a power density of between about 20 HP/lb [horsepower/pound of gearbox weight] to about 125 HP/lb. Another example gearbox 48 includes a power density value between about 30 HP/lb to about 90 HP/lb. In another embodiment, the example gearbox 48 includes a power density between about 50 HP/lb and about 75 HP/lb.

The example high gearbox power density further enables an overall reduction in engine weight and a more favorable location of the engine center of gravity (CG). Improvements to the engine CG enable reduced pylon and wing box weight. Moreover, the high efficiency enabled by the disclosed high power density gearbox reduces airs oil/heat exchanger sizes because more power is transmitted and less is lost as friction that generates heat. Reduced cooling requirements reduce fan stream air cooling requirements such that air previously required for cooling can be utilized for producing thrust further reducing engine fuel burn.

Referring to FIG. 4, the epicyclic gearbox 82 is configured as a star gearbox. The gearbox 82 includes the sun gear 62 driven by the shaft 40 from the low pressure turbine 46. A non-rotatable carrier 80 supports the plurality of star gears 64 driven by the sun gear 62. The carrier 80 is grounded to the engine static structure 36. The ring gear 66 circumscribes the plurality of star gears 64 and drives a fan drive shaft 86 that drives the fan 42.

Referring to FIG. 5, another gearbox 84 is disclosed and is a configuration known as a planetary gearbox that includes the sun gear 62 driven by the low pressure turbine shaft 40. The carrier 80 supports the intermediate gears known as planet gears 65 supported on the carrier 80 and driven by the sun gear 62. A ring gear 67 circumscribes the plurality of planet gears 65 and is fixed to the engine static structure 36. The flexible link 74 is disposed between the low pressure turbine shaft 40. Both the star and planetary gear configurations provide benefits applicable to specific power transfer requirements to enable the advantageous efficiencies provided by rotating the fan section and turbine sections at closer to optimal speeds.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbofan engine comprising:
a fan;
a fan drive turbine section; and
a geared architecture driven by the fan drive turbine section for rotating the fan, wherein the geared architecture comprises an epicyclic gearbox including a central gear supported for rotation about an axis, a plurality of intermediate gears engaged with the central gear and a ring gear circumscribing the intermediate gears, wherein the geared architecture includes a power density comprising a power measured in horsepower (HP) related to a weight of the geared architecture, with the power density being between about 20 HP/lb and about 125 HP/lb.

2. The gas turbofan engine as recited in claim 1, wherein the power density is between about 30 HP/lb and about 90 HP/lb.

3. The gas turbofan engine as recited in claim 1, wherein the power density is between about 50 HP/lb and about 75 HP/lb.

4. The gas turbofan engine as recited in claim 1, wherein the intermediate gears are supported on a journal bearing including a hollow bore.

5. The gas turbofan engine as recited in claim 4, wherein the journal bearing is supported on a flexible structure.

6. The gas turbofan engine as recited in claim 1, including a flexible link between a shaft driven by the turbine section and the central gear accommodating misalignment between the shaft and the central gear.

7. The gas turbofan engine as recited in claim 1, wherein the gearbox comprises a non-rotatable carrier, the intermediate gears supported on the carrier and driven by the central gear, a first flexible coupling between an input shaft driven by the turbine section and the central gear, and a second flexible coupling between a fixed structure and the carrier.

8. The gas turbofan engine as recited in claim 1, wherein the gearbox comprises a rotatable carrier, the plurality of intermediate gears supported on the carrier and driven by the central gear, the ring gear circumscribing the plurality of intermediate gears, a first flexible coupling between an input shaft driven by the turbine section and the central gear, and a second flexible coupling between a fixed structure and the ring gear.

9. A gas turbofan engine comprising:
a fan including no more than 26 fan blades;
a fan drive turbine section including no more than 6 turbine rotors, wherein a ratio between the number of fan blades and the number of turbine rotors is between 3.3 and 8.6;
an gearbox including a central gear supported for rotation about the axis and driven by the fan drive turbine, a plurality of intermediate gears engaged with the central gear and a ring gear circumscribing the intermediate gears; and
a first flexible coupling between an input shaft driven by the fan drive turbine and the central gear, wherein the gearbox includes a power density comprising a power measured in horsepower (HP) related to a weight of the geared architecture, with the power density being between about 20 HP/lb and about 125 HP/lb.

10. The gas turbofan engine as recited in claim 9, wherein the power density is between about 30 HP/lb and about 90 HP/lb.

11. The gas turbofan engine as recited in claim 9, wherein the power density is between about 50 HP/lb and about 75 HP/lb.

12. The gas turbofan engine as recited in claim 9, including a second flexible coupling supporting journal bearings for the plurality of intermediate gears.

13. The gas turbine turbofan as recited in claim 9, wherein the fan drive turbine section includes no more than 3 turbine rotors.

14. A method of assembling a gas turbofan engine comprising:
assembling a fan section including no more than 26 fan blades;
assembling a fan drive turbine to include no more than 6 turbine rotors such that a ratio between a number of the fan blades and a number of the turbine rotors is between 3.3 and 8.6;
assembling a gearbox to include a central gear supported for rotation about an axis and driven by the fan drive turbine, a plurality of intermediate gears engaged with the central gear and a ring gear circumscribing the intermediate gears; and
defining each of the central gear, the plurality of intermediate gears and the ring gear to provide a power density comprising a power measured in horsepower (HP) related to a weight of the geared architecture, with the power density being between about 20 HP/lb and about 125 HP/lb.

15. The method as recited in claim 14, including further defining each of the central gear, the plurality of intermediate gears and the ring gear to provide a power density comprising a power measured in horsepower (HP) related to a weight of the geared architecture, with the power density being between about 30 HP/lb and about 90 HP/lb.

16. The method as recited in claim 14, including further defining each of the central gear, the plurality of intermediate gears and the ring gear to provide a power density comprising a power measured in horsepower (HP) related to a weight of the geared architecture, with the power density being between about 50 HP/lb and about 75 HP/lb.

* * * * *